United States Patent [19]
Clark et al.

[11] 4,126,162
[45] Nov. 21, 1978

[54] AERIAL REFUELING DEVICE

[75] Inventors: Charles R. Clark, Mission Viejo; Richard J. Clark, Redondo Beach; Gerald G. Steele, Mission Viejo, all of Calif.

[73] Assignee: Parker-Hannifin Corporation, Cleveland, Ohio

[21] Appl. No.: 803,901

[22] Filed: Jun. 6, 1977

[51] Int. Cl.² ............................................. B65B 3/04
[52] U.S. Cl. ........................................ 141/98; 49/31; 141/231; 141/311 R; 244/135 A
[58] Field of Search ............... 49/31; 141/1, 94, 98, 141/231, 269, 284, 311 R, 325, 326, 346–350, 382, 386, 392; 244/135 A

[56] References Cited
U.S. PATENT DOCUMENTS
3,976,100  8/1976  Souslin ..................... 244/135 A X Primary Examiner—Richard E. Aegerter
Assistant Examiner—Frederick R. Schmidt
Attorney, Agent, or Firm—John N. Wolfram

[57] ABSTRACT

A device for opening a door on an airplane to expose a refueling receptacle having latches for connection to a fueling nozzle deployed from a tanker airplane so that the airplane may be refueled in flight. The device has a hydraulic actuator for opening and closing the door, first valve means for controlling the first actuator, a second valve means for controlling another hydraulic actuator that locks and releases the latches, a spring for opening the door when there is a failure in the supply of pressure fluid for the first actuator, and a means to prevent closing of the door before the latches are released from the nozzle.

36 Claims, 4 Drawing Figures

4,126,162

AERIAL REFUELING DEVICE

FIELD OF THE INVENTION

This invention relates to in-flight airplane refueling devices of the general type shown in U.S. Letters Pat. No. 2,859,002 wherein a nozzle deployed from a tanker airplane connects to a receptable mounted in an airplane to be refueled whereby fuel may be transferred from the tanker airplane to the receiving airplane. More particularly, the invention relates to a mechanism for opening a door on the receiving airplane for exposing the receptable to which the nozzle attaches for transfer of fuel. One form of such door opening mechanism is disclosed in U.S. Letters Pat. No. 2,938,688.

BACKGROUND OF THE INVENTION

In a prior form of a device having hydraulic actuators for opening a door on an airplane to expose a refueling receptacle having latches for connecting to a nozzle on a tanker plane for refueling in flight, and wherein such prior device controlled another hydraulic actuator for operating the latches into and out of holding engagement with the nozzle, it has been possible to inadvertently cause closing movement of the door before the latches were disengaged from the nozzle. This is a dangerous situation that could cause damage to the parts and possibly cause hazardous fuel spills. In addition, although such prior device has a spring for opening the door in case of failure of pressure fluid being delivered to the hydraulic actuator for opening the door, fluid pressure developed in hydraulic return lines could prevent the spring from opening the door.

It is an object of this invention to overcome these difficulties with prior devices. It is another object to mount the door opening device on a base so that it can be installed and removed from an airplane as a unit and which unit can be tested outside the airplane, as in a laboratory.

SUMMARY OF THE INVENTION

The present invention provides a device for opening a door on a receiver airplane to expose a refueling receptacle having latches for connecting to a fueling nozzle on a tanker airplane whereby the receiver airplane may be refueled in flight. The device has a door hydraulic actuator for opening and closing the door and has a valve means to control both the door actuator and another hydraulic actuator that operates the latches into and out of engagement with the nozzle.

The device has a first locking means for locking the door actuator in door closed position, a second locking means for locking the door actuator in door opened position, a manual actuator for releasing both locking means, a spring to open the door after release of the first locking means in case of failure of the supply of pressure fluid to the door actuator, and means for preventing closing of the door before the latch actuator has released the latches from the nozzle.

The door actuator is controlled by a first three-way valve of simple construction. A fluid pressure responsive four-way valve controls the latch actuator and in turn is controlled by the first three way valve and a second three-way valve. A spring can open the door when failure of pressure fluid being applied to the door actuator and the door actuator has a bypass passage to freely circulate hydraulic fluid from one side of the actuator piston to the other so that movement of the piston by the spring will not be impeded by slow displacement of fluid from the actuator.

DETAIL DESCRIPTION

Figure 2:
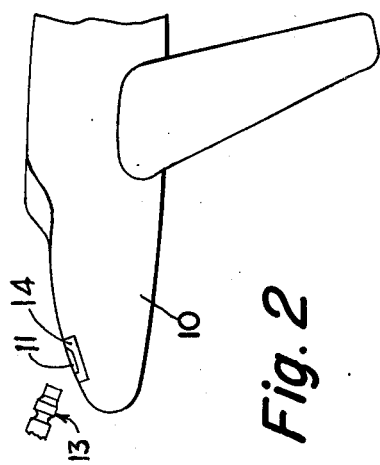
FIG. 2 is a view of an aircraft fitted with a door for exposing a refueling receptacle in its nose.
Figure 4:
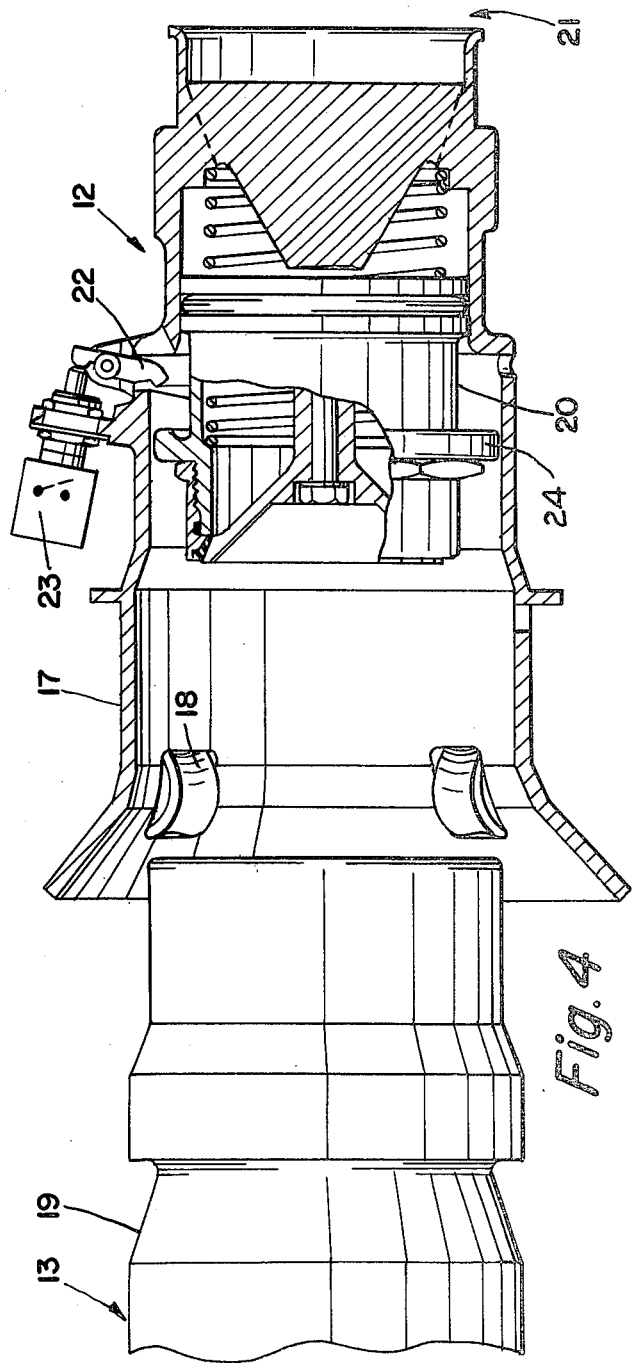
FIG. 4 is an outside perspective view of the box containing the device.

As shown in FIG. 2, a receiver airplane 10 has a box 14 with a door 11 fitted to its nose. The door may be opened inwardly to expose a receptacle 12, shown in FIG. 4, so that a nozzle 13 from a tanker aircraft may be connected to the receptacle for transfer of fuel to the receiver airplane 10.

The receptacle 12 in itself is not a part of the present invention. It includes a hollow housing 17 to receive the forward portion of nozzle 13 and has circumferentially spaced latches 18 projecting through openings in the housing 17 to engage in a groove 19 of the nozzle for locking the nozzle to the receptacle 12.

The receptacle has a sleeve valve 20 that is engaged by the end of nozzle 13 to open the same whereby fuel may be transferred through receptacle 12 to a conduit 21 leading to the fuel tanks of the receiver airplane. Receptacle 12 has a pivoted arm 22 which is engaged by a flange 24 on valve 20 when the latter is in the opened position to close a switch 23 for lighting a signal lamp (not shown) in the aircraft to indicate that the receptacle valve is open. Closing of switch 23 also closes an electric circuit for energizing a solenoid 168.

Figure 1:
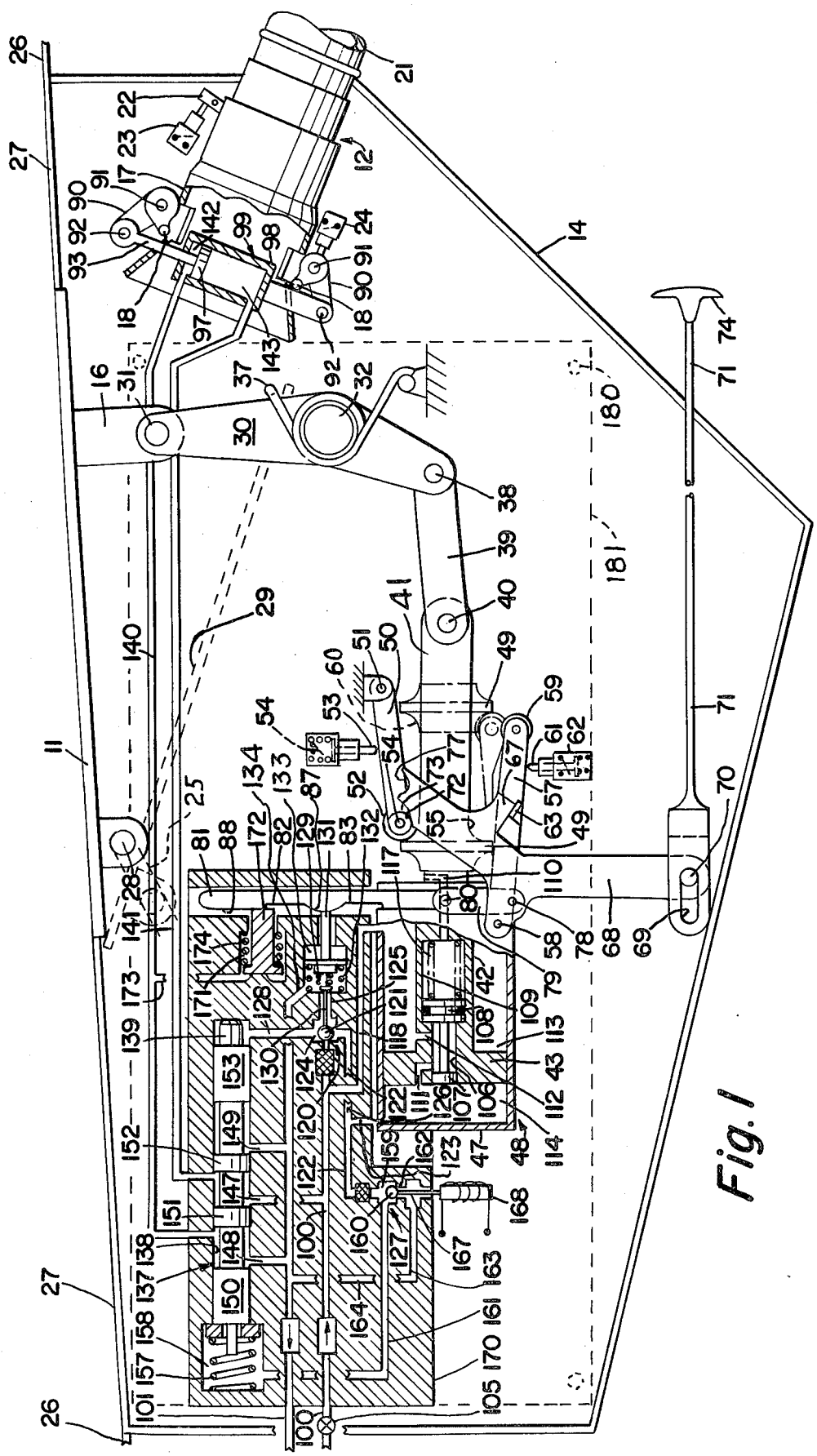
FIG. 1 is a schematic view of the door opening device showing the parts in door closed position with no fluid pressure in the system.
Figure 3:
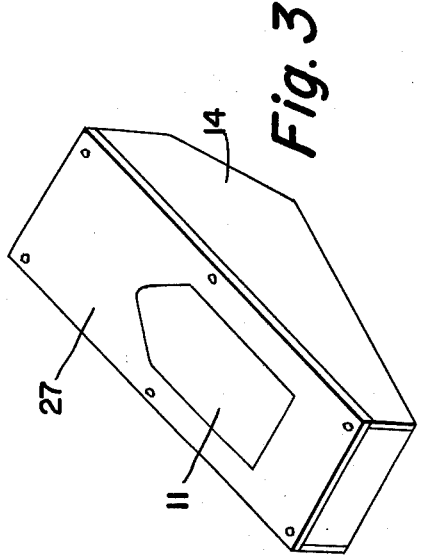
FIG. 3 is a cross section view of the refueling receptacle and a partial view of the nozzle from a tanker airplane.

As shown in FIG. 1, door 11 when in closed position fits flush with the upper surface 27 of the box and the latter surface fits flush with the upper surface 27 of the airplane nose. The door is pivoted on a pin 28 that is slidable in a track 25 so that the portion of the door toward the rear of the airplane may move downwardly and inwardly to the position shown by the dotted line 29. This exposes receptacle housing 12 which is mounted within the box and the door 11 will act as a slipway or guide for directing nozzle 13 into proper engagement with receptacle 12. The sides of the box will also help guide the nozzle.

Near its right hand end, as viewed in FIG. 1, door 11 carries a bracket 16 to which a door arm 30 is pivotally connected at 31. Arm 30 is rotatably mounted on a shaft 32 carried by base 181 in box 14 which is attached to the airplane fuselage by suitable screws, not shown.

Arm 30 is constantly urged in a counterclockwise direction of rotation about pin 32 by a torsion spring 37 and it has a pivotal connection at 38 to a link 39 which in turn has a pivotal connection at 40 to the outer end 41 of a piston rod 42 attached to a piston 43 mounted within a cylinder 47 of a door hydraulic actuator generally designated 48. Mounted on rod outer end 41 is a collar 49. When the parts of the door opening device are in the door closed position as shown in the solid lines of FIG. 1, piston rod 42 is retained in its retracted position by a first locking means comprising a link 50 pivotally mounted at one end to a pin 51 mounted on base 181 and which at its other end has a roller 52 that engages an outwardly facing surface 55 of collar 49. Link 50 is engaged by a spring pressed plunger 53 which operates a switch 54.

In the retracted position of rod 42, collar 49 bears against the upper surface of link 57 which comprises a second locking means for locking rod 42 in its extended position when door 11 is open. Link 57 is pivotally attached at one of its ends to a pin 58 mounted on base 181 and at its other end has a roller 59 to engage an inwardly facing surface 60 on collar 49 when rod 42 is fully extended to lock the rod in its door opening position. Link 57 is moved to this position for roller 59 engaging collar surface 60 by a spring pressed plunger 61 which in this position closes a switch 62 for energizing a signal light (not shown) to indicate that the door is in a locked open position.

In the retracted position of rod 42, link 57 is prevented from swinging counterclockwise about pivot 58 to its locking position by engagement with collar 49 and also by means of a lug 63 carried by link 57 and engaged by a projection 67 on a cam arm 68 mounted on pin 58. Cam arm 68 is connected at its lower end by a lost motion connection 69 and a pin 70 to a cable 71. Cam arm 68 at its upper end has a cam surface 72 engageable with another roller 73 mounted on pin 54 for raising roller 52 out of engagement with collar surface 55 and it has a detent groove 77 to receive roller 73 for maintaining link 50 in its upper unlocked position when rod 42 is fully extended. Cable 71 is within a tube, not shown, so that it may be pushed as well as pulled for moving arm 68.

Cam arm 68 also has pivotally connected thereto at 78 a link 79 which at its other end is pivotally connected by a pin 80 to a rod 81 having two grooves 82, 83 therein with a land 87 therebetween and another land 88 at the outer end of rod 81.

Latches 18 comprise arms 90 pivotally connected at 91 to receptacle housing 17 and at pins 92 to piston rod 93 and to an axially movable cylinder 98 of a second hydraulic actuator generally designated 99.

Fluid under pressure is supplied to actuators 48 and 99 by means of a supply conduit 100 and fluid is exhausted therefrom by means of a return conduit 101. In some installations pressure fluid is not supplied to conduit 100 until it is desired to open door 11, at which time isolation valve 105 is opened. In other cases valve 105 is omitted and pressure fluid is always supplied to conduit 100 when the airplane is in use.

Mounted within a bore 106 in piston 43 and rod 42 of actuator 48 is a valve 107 which is connected to a piston 108 mounted within a bore 109 which is vented on one side of piston 108 to atmosphere by a passage 110. Valve 107 controls flow of fluid through bypass passages 111 and 112 from chamber 113 on one side of piston 43 to chamber 114 on the other side of this piston. Valve 107 is presented to an open position by spring 117 when there is no fluid pressure in chambers 113 and 114.

When there is fluid under pressure in supply line 100, it is constantly directed to chamber 113 by way of conduit 118. At such time it acts upon piston 108 to move valve 107 to a position between ports 111 and 112 to close off communication between 113 and 114.

A three-way valve 120 includes a ball 121 which controls flow to fluid from supply conduit 100 through conduits 122 and 123 and orifice 126 to chamber 114 of actuator 48 and through conduit 122 and orifice 126 to another three-way valve 127. Ball valve 121 also controls flow of fluid into conduit 128. Ball 121 is urged toward a position for closing off conduit 120 by a spring 129 acting between a pin 130 and a plunger 131. Plunger 131 is normally pressed in a direction away from ball 121 by a spring 132 that is stronger than spring 129.

Plunger 131 is mounted within a chamber 133 of valve 120 and this chamber is vented to return line 101 by a conduit 134. Chamber 133 is connected to valve chamber 124 by a passage 125.

A valve generally designated 137 controls flow of fluid to and from latch actuator 99. It includes a bore 138 in which a spool 139 is slidably mounted. Conduits 140 and 141 connect chambers 142 and 143, respectively, of actuator 99 with bore 138. Conduit 147 connects bore 138 with supply conduit 100 and conduits 148 and 149 connect bore 138 with return line 101. Spool 139 has lands 150, 151, 152, and 153 for controlling flow of fluid through valve 137 and there is a spring 157 within a chamber 158 for normally holding spool 139 in a rightward position.

Valve 127 has a chamber 159 containing a ball valve 160 for controlling flow of fluid through conduits 122, 161 and 162 which communicate with chamber 159. Conduit 162 connects by way of conduit 163 with return line 101 and conduit 161 connects to chamber 158. Ball valve 160 is movable to a position for closing conduit 122 by a plunger 167 when a solenoid 168 is energized. Valves 120, 127 and 137 may be contained in a single housing 170, if desired, and this housing may also contain a chamber 171 in which a plunger 172 is mounted. Chamber 171 is connected to conduit 140 by another conduit 173 and plunger 172 is pressed in a left-hand direction by a spring 174. Plunger 172 projects from chamber 171 and is engageable with rod 81. Removably secured within box 14 by suitable bolts 180 is a base 181. Valve housing 170, door actuator 48, arms 68 and 30, links 50, 57 and switches 54 and 62 are mounted on base 181 so as to comprise a simple unit that may be easily installed and removed from box 14 when the latter is installed in the aircraft. When removed from box 14 this unit may be functionally tested, as in a laboratory, and if defective may be either repaired or replaced by a similar unit. This greatly facilitates installation in and removable from an aircraft of the parts constituting this unit as well as testing of the interrelated functioning of such parts.

Operation

Before initiation of the operation to open door 11, and if fluid pressure supply line 100 is not connected to a source of fluid pressure, the parts of the door opening device are in the positions shown in the full lines of FIG. 1. At this time latches 18 are in a retracted position, cable 71 is in a retracted position, valve 107 is springpressed to its leftward position, ball valve 121 is pressed by spring 129 into a position for shutting off conduit 100, solenoid 168 is de-energized, spring 157 maintains spool 139 to its right-hand position, plunger 172 is pressed to its left-hand position by spring 174, plunger 131 is pressed by spring 132 against land 87 of rod 81, and piston rod 42 is locked in its retracted door closing position by roller 52 of link 50 bearing against collar surface 55.

To initiate opening of door 11, valve 105, if in the system, is first turned on to pressurize the fluid in supply conduit 100. This causes chamber 113 of actuator 48 to become pressurized via conduit 118 and to act upon piston 108 via passage 112 to move valve 107 to a closed position between passages 111 and 112. Such pressure in chamber 113 also acts upon piston 43 to hold rod 42 in retracted position against the force of torsion spring 37 which is acting in a manner to extend rod 42.

Cable 71 is now manually pulled by means of handle 74 to an extended position. This causes arm 68 to rotate in a counterclockwise direction about pivot 58. Such rotation causes cam surface 72 to act upon roller 73 to rotate link 50 in a clockwise direction about pivot 51 so that roller 52 moves upwardly out of register with surface 55 of collar 49 and thus unlock rod 42 from extending. Clockwise rotation of arm 50 raises plunger 53 to close switch 54 to energize a signal lamp (not shown) to indicate that rod 42 has been unlocked from its retracted position.

Counterclockwise rotation of arm 68 causes rod 81 to move upwardly until plunger 131 moves from land 87 into recess 83. This releases ball valve 121 from its position closing conduit 100 and permits pressure fluid from conduit 100 to enter chamber 114 by way of conduits 122 and 123. This also causes pressurization of fluid at the opposite ends of spool 139 by way of conduits 128, 122 and 161. Because the two ends of spool 139 have equal areas subjected to the fluid pressures acting thereon, spool 139 will be pressure balanced and will remain in the position shown in FIG. 1 because of the action of spring 157. In this position, pressure fluid from conduits 100 and 147 will pass through valve 137 into conduit 141 and into chamber 143 of latch cylinder 99 to hold latches 18 in their unlock position.

Counterclockwise rotation of arm 68 also causes projection 67 to move away from lug 63. However, collar 49 bearing on the upper surface of link 57 will hold the latter in the position shown in FIG. 1 against the force of spring pressed plunger 61 tending to move link 57 in counterclockwise rotation about pivot 58.

Opening of conduit 100 by valve 121 permits pressure fluid to flow from conduit 100 through conduit 122 and orifice 126 into chamber 114 of actuator 48. Because the area of piston 43 subject to pressure in chamber 114 is greater than the area of such piston subject to pressure in chamber 113, piston 43 will move to the right for extending piston rod 42. When the rod has been extended so that collar 49 is in the position shown in the dotted line of FIG. 1, spring pressed plunger 61 will move link 57 in counterclockwise rotation until roller 59 engages collar surface 60 to lock the piston rod 42 in its extended position. Extension of rod 42 is assisted by spring 37 which urges arm 30 into counterclockwise rotation about pivot 32. Spring 37 is actually strong enough to extend rod 42 fully upon raising of roller 52 out of contact with collar surface 55 by extension of cable 71 even though no fluid pressure may be delivered to chamber 114 because of a failure of the fluid pressure supply. In such case, there would likewise be no fluid pressure in chamber 113 and piston 108 under the influence of spring 117 would move valve 107 to the position shown in FIG. 1 so that hydraulic fluid that might otherwise slowly bleed from chamber 113 through valve 120 can freely bypass into chamber 114 and thus not impede opening of door 11 by spring 37.

Upon extension of rod 42, either by spring 37 acting alone or in conjunction with fluid pressure in chamber 114, arm 30 is rotated in a counterclockwise direction causing the right-hand portion of door 11 to swing downwardly about pivot 28 to an open position in which receptacle 12 is exposed. When the door reaches its open position and plunger 61 has moved roller 59 into locking engagement with collar surface 60, switch 62 is closed for energizing a "ready" light (not shown) to indicate that the door is opened and locked so that nozzle 13 may be inserted and connected to receptacle 12. The two airplanes are then maneuvered to insert nozzle 13 into receptacle housing 17. As it is inserted, the end of nozzle 13 engages sleeve valve 20 and moves it inwardly for opening a flow path in the receptacle. When sleeve valve 20 is fully opened a flange 24 thereon engages pivoted arm 22 which closes switch 23 to both light a signal light (not shown) and to energize a solenoid 168 for moving ball valve 160 to a position for closing conduit 122 and for opening conduit 161 to passage 162 and return passages 163 and 101. This exhausts pressure fluid from chamber 158 and permits pressure fluid acting on the right-hand end of spool valve 139 to move the latter to the left to direct pressure fluid from conduit 147 into conduit 140 and chamber 142 of latch actuator 99 while also connecting latch actuator chamber 143 to return line 101 via conduits 141 and 149. At the same time, fluid pressure in conduit 140 is directed to the left-hand side of plunger 172 via conduit 173 to move the plunger into recess 82 to lock rod 81 in its upward position. This positively prevents arm 68 from being inadvertently rotated in a clockwise direction about pivot 58 through retraction of cable 71 which would otherwise cause lowering of bar 81 so that land 87 would register with plunger 31 to cause valve 121 to close pressure conduit 100 whereupon pressure fluid from chamber 114 would exhaust through conduits 123, 122, 125, 134 and 101 and pressure in chamber 113 would retract rod 42 for closing door 11 while nozzle 13 is still latched to receptacle 12. Obviously this could cause damage and possible fuel spills.

Upon fluid pressure being applied to latch cylinder chamber 142 as indicated above, piston 97 and rod 93 are retracted into cylinder 98 and arms 90 rotate about pivots 91 to cause latches 18 to move into nozzle groove 19 for locking the nozzle in its inserted position with sleeve valve 20 open. Upon latches 18 rotating into their lock position, latch switch 24 is closed for energizing a signal light (not shown) to indicate that the nozzle is latched in position so that fueling may begin. During such fueling, link 57 remains in its position against collar surface 60 for locking rod 42 in its extended position with door 11 open and plunger 172 in slot 82 prevents clockwise rotation of arm 68 which would otherwise cause projection 67 to engage lug 63 and move link 57 out of such lock position. Thus, it is not possible to cause or permit door 11 to close while nozzle 12 is locked to receptacle 12 by latches 18.

Upon completion of the fueling operation, the flow of fuel will be shut off in the tanker airplane and the pilot in either airplane can then operate a switch, not shown, to de-energize solenoid 168. This permits ball valve 160 to move to a position for opening conduit 122 and closing passage 162 whereupon pressure fluid in conduit 122 will pressurize chamber 158 via conduit 161 to counterbalance the pressure on the right-hand end of spool 139 and permit spring 157 to move spool 139 to the position shown in FIG. 1. In this position, pressure fluid in conduit 147 will be delivered to conduit 141 and chamber 143 of latch actuator 99 while fluid from chamber 142 will be exhausted through conduits 140 and 148 to return line 101. This will cause piston rod 93 and cylinder 98 of the latch actuator to extend and move latches 18 out of nozzle groove 19 to thereby release the nozzle. As latches 18 move out of groove 19 switch 24 is opened to de-energize the signal light for indicating that the nozzle is unlatched. The aircraft may then be maneuvered for detaching the nozzle from the receptacle. As this occurs, sleeve valve 20 in the receptacle closes and releases arm 22 so that switch 23 may resume its open position and be ready for the next fueling operation.

Meanwhile, release of pressure in conduit 173 and the left side of plunger 172 so that spring 174 retracts the latter out of groove 82. This permits arm 68 to be rotated in a clockwise position about pivot 58 upon retraction of cable 71.

Such clockwise rotation of arm 68 causes projection 67 to engage lug 63 and rotate link 57 in a clockwise direction against the urging of spring pressed plunger 61 to release roller 59 from surface 60 of collar 49 and thus unlock rod 42 so that it may be retracted.

Such clockwise rotation of arm 68 also moves rod 81 downward so that plunger 131 moves onto land 87 and is moved leftward against spring 132 to cause spring 129 to compress and move valve 121 into its left-hand position for closing conduit 100 and opening passage 125. This causes fluid from chamber 114 of door actuator 48 to be exhausted through conduits 123 and 122 through passage 125 and conduit 134 to return line 101 whereupon pressure in chamber 113 moves piston 143 and rod 42 to the retracted position as shown in FIG. 1. Upon movement of arm 68 in the clockwise direction, detent groove 77 is disengaged from roller 73 but link 50 is maintained in its clockwise rotation position by collar 49 bearing upon the underside of link 50 as rod 42 and collar 49 are retracted. When the latter reach their fully retracted position, spring pressed plunger 53 rotates link 50 in a counterclockwise direction to cause roller 52 to engage surface 55 of collar 49 to lock piston rod 42 in its retracted position.

Movement of plunger 53 downward to cause link 50 to move into its locking position opens switch 54 to extinguish the signal light which when out indicates that link 50 has locked piston rod 42 in its retracted position. As piston rod 42 retracts, it causes arm 30 to rotate in a clockwise direction about pivot 32 against the pressure of spring 37 to cause door 11 to rotate about pivot 28 to its closed position. Valve 105, if in the system, may now be shut off for disconnecting conduit 100 from the pressure source.

We claim:

1. A device for opening a door on an airplane to expose a refueling receptacle having a hydraulically operated latch actuator connected to latches for engaging a fueling nozzle comprising a door hydraulic actuator having a rod connectable to the door for moving the door to open and closed positions and including a piston attached to the rod, first locking means movable from a release position to a position for locking the rod in a retracted position in which the door is closed, second locking means movable from a release position to a position for locking the rod in an extended position in which the door is open, a manual actuator movable to a first position in which it holds the second locking means in its release position and movable to a second position in which it holds the first locking means in its release position, first conduit means for directing flow of pressure fluid to one side of said piston for moving said rod to its extended position, second conduit means for directing flow of pressure fluid to the other side of the piston for moving the rod to its retracted position, a first valve controlling flow of fluid through said second conduit means, means to hold the first valve in a position to close said second conduit means when the manual actuator is in its first position, and a second valve for controlling flow of pressure fluid to and from said latch actuator.

2. The device of claim 1 in which there is a spring for moving the rod toward its extended position when said first locking means is moved to its release position.

3. The device of claim 2 in which there is an arm rotatable about a pivot and connected at its one end to the door and at its other end to said rod, and said spring bears on the arm to urge it toward a rotative position in which it causes the door to be open.

4. The device of claim 2 in which the spring has sufficient force for extending the rod in case of failure in the supply of pressure fluid to said one side of said piston.

5. The device of claim 2 in which there is a passage connecting said one side of the piston with said other side, a third valve controlling flow of fluid through said passage, and means to open said third valve when there is no pressure fluid on either side of said piston.

6. The device of claim 5 in which said passage is in said piston and said last mentioned means comprises a spring.

7. The device of claim 1 in which there is a first means for moving said first locking means to its locking position when said rod is retracted.

8. The device of claim 7 in which said first means is spring pressed for moving the first locking means to its locking position.

9. The device of claim 1 in which there is a second means for moving said second locking means to its locking position when said rod is extended.

10. The device of claim 1 in which said rod has abutment means thereon engageable by said first and second locking means in their respective locking positions for holding the rod in the respective retracted and extended positions.

11. The device of claim 10 in which said abutment when the rod is in positions intermediate its first and second positions engages said first and second locking means to hold them in their release positions.

12. The device of claim 1 in which said manual actuator includes a blocking means to prevent opening of said first valve when said manual actuator is in its first position.

13. The device of claim 12 in which there is a third locking means engageable with a portion of the manual actuator to prevent movement of said manual actuator from its second position to its first position when said second valve is directing pressure fluid to the latch actuator for moving the latches into engagement with the nozzle.

14. The device of claim 13 in which said third locking means is fluid pressure operated into said engagement with said portion.

15. The device of claim 14 in which said third locking means is spring pressed out of engagement with said portion when the second valve is directing fluid to the latch actuator for moving the latches out of engagement with the nozzle.

16. The device of claim 1 in which said first valve comprises a three-way valve having a first position in which it blocks flow of pressure fluid to said one side to a return conduit and having a second position in which it blocks said return conduit and connects said pressure fluid to said one side of said piston.

17. The device of claim 16 in which said first valve is spring pressed to its first position and moved by fluid to its second position.

18. The device of claim 1 in which there is a restricted orifice in said first conduit means leading to said one side of the piston.

19. The device of claim 1 in which said second valve is spring pressed toward a first position for directing pressure fluid to the latch actuator for moving the latches out of engagement with the nozzle, said second valve having oppositely facing fluid pressure responsive surfaces, said first valve when directing pressure fluid to said one side of the piston also directing pressure fluid to one of said surfaces to move the second valve to a position for directing pressure fluid to the latch actuator for moving the latches into engagement with the nozzle.

20. The device of claim 19 in which there is a fourth valve controlling flow of pressure fluid from the first valve to the other of said surfaces to balance the pressure on said one surface whereby said spring will move the second valve to its first position.

21. The device of claim 20 in which said fourth valve is a three-way valve having a first position in which it blocks flow of pressure fluid from the first valve to said other surface and opens a conduit connecting said other surface to a return line and having a second position in which it permits flow of pressure fluid from the first valve to said other surface and blocks said other surface from said return line.

22. The device of claim 21 in which said fourth valve is solenoid operated.

23. The device of claim 1 in which said last mentioned means includes a plunger movable toward the first valve by said manual actuator and a rod pressed by a first spring that engages the plunger for causing the first valve to close said second conduit when the manual actuator is in its first position.

24. The device of claim 23 in which said plunger is movable by a second spring away from said rod when said manual actuator is in its second position to release said first valve whereby the latter may be moved by fluid pressure to a position for opening said second conduit.

25. The device of claim 1 in which said manual actuator includes a manually operated rod, a pivoted arm having one end connected to the rod and having portions engageable with said first and second locking means.

26. The device of claim 25 in which said arm carries another portion for controlling operation of said first valve.

27. A device for opening a door on an airplane to expose a refueling receptable having latches to connect to a fueling nozzle comprising a door actuator having a rod connectable to the door for moving the same to open position upon extension of the rod and to closed position upon retraction of the rod, first locking means for locking the door actuator in its rod retracted position, means for releasing said locking means, a fluid pressure supply conduit, means actuated by said releasing means upon release of said locking means for directing pressure fluid from said conduit to said door actuator for extending said rod, a valve connected to said conduit for directing fluid therefrom to an actuator for said latches, said valve having a normal position for causing the latch actuator to retract the latches, and means actuable by said nozzle for causing said valve to move to another position for causing the latch actuator to extend the latches.

28. The device of claim 27 in which there is a spring operable to open said door upon release of the locking means in the event of failure of pressure fluid to be directed to said door actuator.

29. The device of claim 27 in which there is a second locking means to lock the door actuator in its rod extended position, means to release said second locking means, and means to prevent release of the second locking means when the latch hydraulic actuator is holding the latches in engagement with the nozzle.

30. A device for opening a door on an airplane to expose a refueling receptacle having latches to connect to a fueling nozzle comprising a door actuator connectable to the door for moving the door to open and closed positions, first locking means holding the door actuator in a position for maintaining the door closed, manually controllable means for releasing said first locking means, means for directing flow of pressure fluid to said door actuator for moving the door to open position, spring means connected to the door actuator and effective upon release of said first locking means for exerting a force on the actuator for moving the door in an open direction, and means responsive to failure of pressure fluid to flow to said door actuator to freely bypass fluid from one side of the door actuator to the other whereby the door actuator may be freely moved by said spring as aforesaid.

31. The device of claim 30 in which there is a valve controlling flow of pressure fluid to a latch actuator for moving said latches into and out of holding engagement with said nozzle.

32. The device of claim 31 in which there is a means to prevent actuation of the door actuator for closing said door while said latch actuator holds the latches in engagement with said nozzle.

33. the device of claim 30 in which said spring assists said door actuator in opening said door when pressure fluid is supplied to said door actuator for this purpose.

34. A device for opening a door on an aircraft to expose a refueling receptacle having a hydraulic latch actuator for latching a fueling nozzle to the receptacle, said device comprising a base, a hydraulically operated door actuator connectable to the door for moving the door to open and closed positions, valve means connectable to the door actuator and to the latch actuator for controlling flow of fluid to and from the same, and mechanically operated means connected to the valve means for controlling the same, said door actuator, valve means and mechanically operated means being mounted on said base for installation and removal from the aircraft as a unit.

35. In the device of claim 34, means for mounting the base in a box containing said receptacle.

36. In the device of claim 34, locking means for locking the door actuator in door opening and door closing positions, and said locking means being carried by said base as a part of said unit.

* * * * *